(12) United States Patent
Khan et al.

(10) Patent No.: US 6,399,166 B1
(45) Date of Patent: Jun. 4, 2002

(54) LIQUID CRYSTAL DISPLAY AND METHOD

(75) Inventors: Ir Gvon Khan; Yuri A. Bobrov; Victor A. Bykov; Leonid Y. Ignatov, all of Moscow (RU); Pavel I. Lazarev, Belmont, CA (US)

(73) Assignee: Optiva, Inc., South San Francisco, CA (US)

( * ) Notice: Subject to any disclaimer, the term of this patent is extended or adjusted under 35 U.S.C. 154(b) by 0 days.

(21) Appl. No.: 09/171,299

(22) PCT Filed: Apr. 15, 1997

(86) PCT No.: PCT/US97/05423

§ 371 (c)(1),
(2), (4) Date: Apr. 23, 1999

(87) PCT Pub. No.: WO97/39380

PCT Pub. Date: Oct. 23, 1997

(Under 37 CFR 1.47)

(30) Foreign Application Priority Data

Apr. 15, 1996 (RU) .......................................... 96107430

(51) Int. Cl.[7] .............................................. C09K 19/60
(52) U.S. Cl. ................. 428/1.31; 359/491; 359/492; 534/607; 534/611; 546/35; 546/37; 428/1.2
(58) Field of Search .................................. 428/1.2, 1.31; 359/491, 492; 546/35, 37; 534/607, 611, 615, 818, 781, 791, 825, 827

(56) References Cited

U.S. PATENT DOCUMENTS

| | | | | |
|---|---|---|---|---|
| 3,941,901 A | | 3/1976 | Harsch | ........................ 427/108 |
| 5,357,357 A | * | 10/1994 | Imazeki et al. | ................ 359/76 |
| 5,739,296 A | * | 4/1998 | Gvon et al. | .................. 534/577 |
| 6,049,428 A | * | 4/2000 | Khan et al. | .................. 359/491 |

* cited by examiner

*Primary Examiner*—Harold Pyon
*Assistant Examiner*—Sow-Fun Hon
(74) *Attorney, Agent, or Firm*—Flehr Hohbach Test Albritton & Herbert LLP

(57) ABSTRACT

A liquid crystal display has a first substrate plate and a second substrate plate, and a liquid crystal layer disposed between the plates. A polarizing coating, having molecules of one or more organic dyes capable of forming a lyotropic liquid crystalline phase, is formed overlying a selected surface of each plate. Orientation of the polarizing coating is obtained by applying a force to the dye molecules when in the liquid crystal phase and subsequently converting the liquid crystal phase to a solid film.

12 Claims, 1 Drawing Sheet

LIQUID CRYSTAL DISPLAY AND METHOD

BACKGROUND

This invention refers to information display devices, and in particular, to liquid crystal (LC) cells, that can be employed in systems involving optical devices for various purposes, such as planar displays, optical modulators and matrix systems of light modulation.

The known devices of this type usually comprise a flat cell formed by two parallel glass plates with electrodes deposited onto the inner surfaces of the plates. The electrodes are made of a conducting optically transparent material such as tin dioxide. The surface of the plate carrying the electrode is specially treated to ensure the required homogeneous orientation of the molecules of liquid crystal both at the surface and in the bulk of the LC. In a homogeneously oriented layer, the long axes of the liquid crystal near the plate surfaces are aligned parallel to the orientation directions of each of the plates. Usually these orientation directions are perpendicular. After assembling the cell, it is filled with a liquid-crystalline compound to form a 5 to 20 micrometer (mm) thick layer, which is the active medium changing the optical properties (namely, the angle of rotation of the polarization plane) of the cell under the action of an applied electric voltage. This change of optical properties is detected by crossed polarizers that are usually fixed to the external surfaces of the plates. For example see L. K. Vistin, "*Application of Liquid Crystals in Modern Technology*", Journal of All Union Chemical Society, Vol. XXVII, no. 2, (1983), pp. 141–48, which is incorporated by reference herein.

The polarizers employed for this purpose are usually based on polyvinyl alcohol (PVA) films colored by iodine vapors or dichroic dyes; they possess low mechanical strength. Thus special protection measures are required to avoid mechanical damage of the system, making the device more complicated and expensive. As a result, the polarizer can become a complex structure containing up to ten layers:

1. protection film;
2. weak adhesive layer;
3. first carrier film;
4. adhesive layer;
5. polarizing film;
6. adhesive layer;
7. second carrier film;
8. adhesive;
9. silicon compound;
10. release film.

Before attaching the polarizer, the siliconized film (layers 9 and 10) is detached, and after assembling the LC display, the protective film with a weak adhesive layer (layers 1 and 2) can be removed and replaced by a protective glass. As a result, an assembled liquid crystal cell can have more than 20 layers. Note that damage of only one of these layers can make the polarizer inapplicable for use in LC cells. For example see A. E. Perregaux, "*Polarizers for liquid crystal devices: the user's viewpoint*". SPIE, Vol. 307 Polarizers and Applications, pp. 70–5, (1981), incorporated by reference herein.

One of the ways to protect polarizers from mechanical damage is to place them inside the cell. To this end, the plates carrying deposited transparent electrodes are covered with a polymer (e.g., PVA) solution that may also contain iodine or a dichroic dye. Then the polymer solution is subjected to a shear deformation (e.g., using a squegee moved along the plate surface), upon which the linear polymer molecules are aligned in the direction of squegee motion. After the removal of solvent, the resulting PVA film (containing iodine or a dichroic dye) is oriented and can simultaneously produce both the polarization of light and the alignment of liquid crystal. Then the cell is assembled, filled with a liquid-crystalline compound, and sealed. In this system, the polarizer is inside the cell and is thus protected against the external mechanical factors. For example see U.S. Pat. No. 3,941,901 issued Mar. 2, 1976 to Thomas B. Harsch and incorporated herein by reference.

The main disadvantages of this device are as follows:

(a) Low thermal stability, which is caused by the use of polyvinyl alcohol (or other vinyl polymers) for obtaining the polarizing film, and iodine for dyeing the film;

(b) The use of iodine (soluble in the liquid-crystal medium) for dyeing the polymeric results in gradually decreasing contrast of the pattern and markedly increasing energy consumption, eventually reducing the useful life of the device.

Inventor's Certificate No. 697,950, "*A Method of Preparing Liquid Crystal Devices*", published Nov. 19, 1979, and incorporated herein by reference, shows a system similar to the instant invention in that it is a device, previously known, with polarizers placed inside the LC cell. To create the internal polarizing layer of this previously known device, the inner surface of a plate is coated (above a transparent electrode film) with a dichroic dye gel having a concentration of 1 to 30 weight percent (wt. %). The gel is then mechanically oriented (e.g., by centrifugation), which ensures obtaining a thin dye film of required thickness. After solvent removal, the surface of the plate carries a thin film of a molecularly oriented dye layer, which serves simultaneously as a polarizer and a alignment layer for homogeneously oriented liquid crystal. Therefore, this system, like that described in the aforementioned U.S. Pat. No. 3,941,901, does not require deposition of any additional alignment layers. The plates prepared in this manner are used to assemble a standard LC cell, which is filled with an appropriate liquid-crystalline compound and sealed.

The dichroic dyes are usually represented by compounds of the azoxy group having anisotropic molecules (e.g., chrysophenine, Brilliant Yellow, Direct Blue 14, etc.).

The known LC device of the aforementioned Inventor's Certificate exhibits higher stability than that reported in the aforementioned U.S. Pat. No. 3,941,901, because the polarizer is formed by a film comprising a dye alone, offering higher thermal stability as compared to that of vinyl polymers.

At the same time, this device also has some disadvantages that restrict the field of possible applications and decrease the useful life. The most noticeable of these are as follows:

(a) Dyes used for creating the polarizing films belong to the class of azo compounds, which have relatively poor thermal and light stability;

(b) Dye solutions used exhibit insufficient wetting of the surface and pronounced viscoelastic rheological properties, which make forming homogeneous polarizing films a quite difficult task;

(c) This LC cell design is characterized by differing surface properties between the materials of transparent electrode and substrate and by a marked relief of the transparent electrode surface, which result in a disorientation of the polarizing coating on the contour boundary of the transparent electrode;

(d) This LC cell design requires placing the reflector on the outer side of the substrate plate in a reflection mode cell, which markedly reduces the advantages achieved by using a cell design with internal polarizing films.

(e) This cell design does not allow creation of an LC cell embodiment employing the supertwist effect.

The purpose of this invention is then to create LC elements with increased performance over previously known LC cells, including LC cells of the reflection type and the LC cells based on the supertwist effect, with the arrangement of all functional optical layers on the inner side of substrates.

The problem formulated above can be solved by implementing one or more of the following ideas:

(a) The internal polarizers are represented by a thin layer of molecular-oriented dichroic dyes forming a polarizing coating;

(b) The polarizing coating is formed from a lyotropic liquid crystalline composition based on organic dyes capable of forming the corresponding LC phase described, (e.g., by formulas I–X) to provide for polarizers with high thermal and light stability;

(c) The reflecting film is formed on the inner surface of the plate;

(d) In the supertwist-nematic cell, the color compensation is achieved by forming a birefringent non-absorbing film with preset optical thickness on the polarizing coating;

(e) Additional protective and leveling layers, are made on the inner surfaces of the plates.

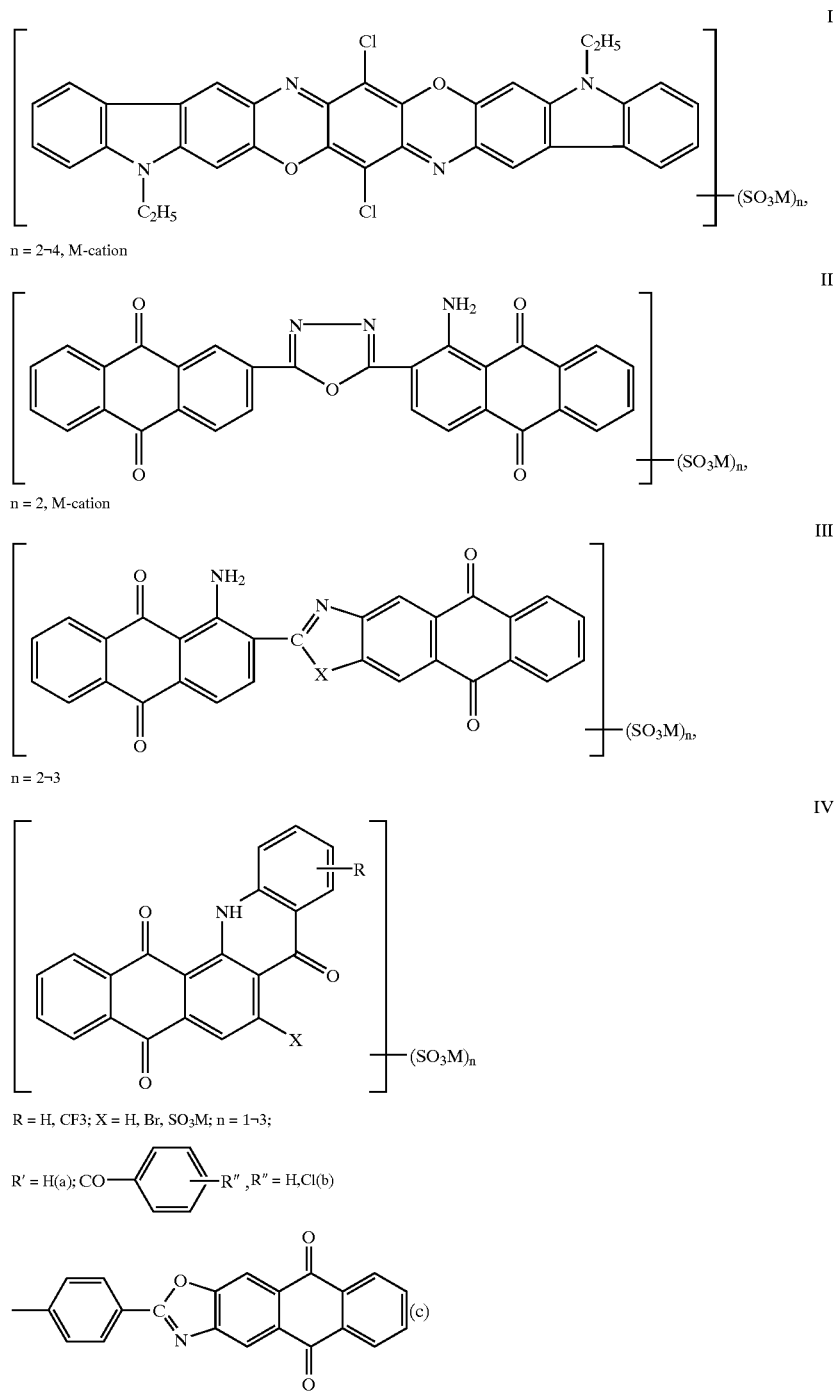

V
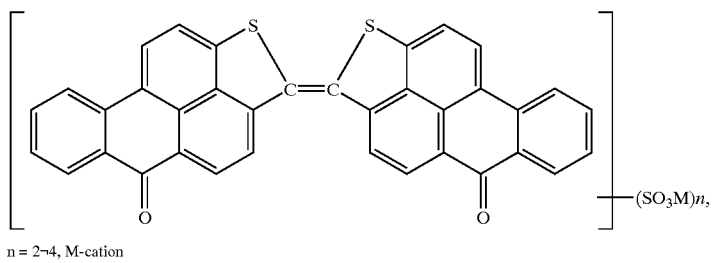
n = 2¬4, M-cation
VI
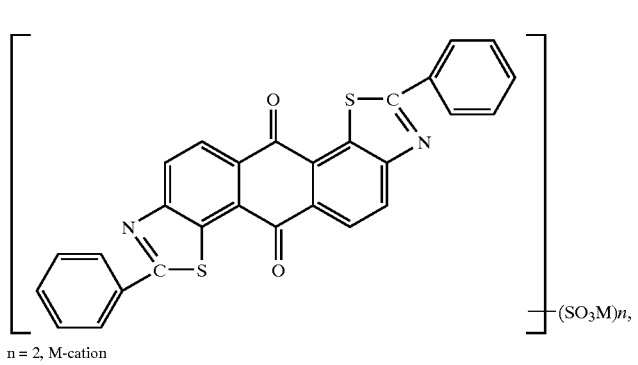
n = 2, M-cation
VII
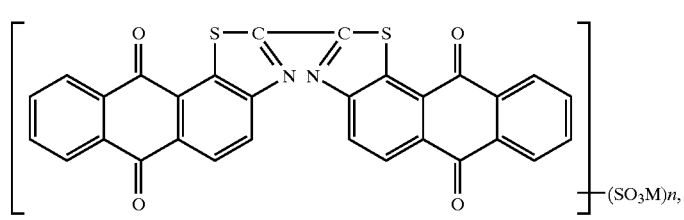
n = 2, M-cation
VIII
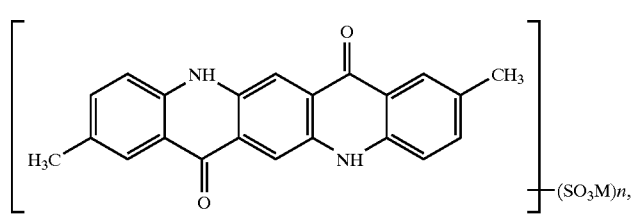
n = 2, M-cation
IX
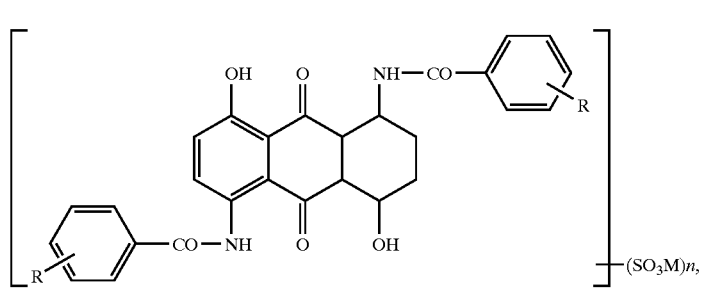
R = H, Cl, Alk, OAlK; n = 2, M-cation

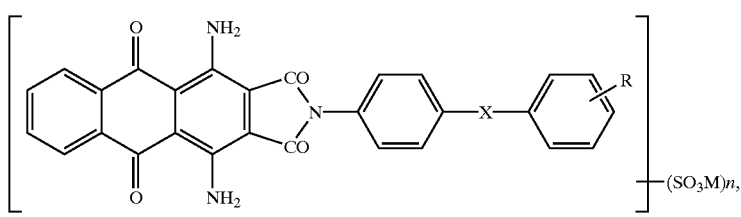

R = H, OAlK, NHR; Cl, Br
X = O, NH, CH₂; n = 2, M-cation

Besides the dyes, the liquid-crystalline compositions employed for the obtaining of polarizing coatings contain the following components:

(a) a modifying additive to control adhesion of the polarizing coating to the substrate and to produce a plasticizing effect on the coating. This additive can be any of the following types of substances:

low-volatile and high-molecular compounds containing various functional groups (OH, COOH, CONH2, NH, CHO, CO, etc.), for example, pentaerythritol, succinic aldehyde, hydroxycarboxylic acids, poly(ethylene glycol), poly(acrylic acid), poly(acrylamide), poly(ethyleneimine), polyethylenepolyamines, poly(propyleneglycol), their copolymers, etc.;

various lacquers, binders, and glue compositions, including organoelemental ones, such as organosilicon lacquers of the KO grade (where 'KO' is a Russian grade of organosilicon lacquers);

liquid-crystalline polymers, for example, poly(n-benzamide), poly(n-phenylene terephthalimide), and cellulose esters (hydroxypropyl or ethyl derivatives).

(b) A surfactant, which facilitates wetting of the substrate surface;

(c) An antioxidant or inhibitor, which is introduced into the lyotropic liquid-crystalline composition to increase its stability to light and elevated temperature, or to the action of oxidizers, lacquers, and glues.

All the above components allow us to increase both the performance and the working characteristics of polarizing coatings.

DETAILED DESCRIPTION

Figure 1:
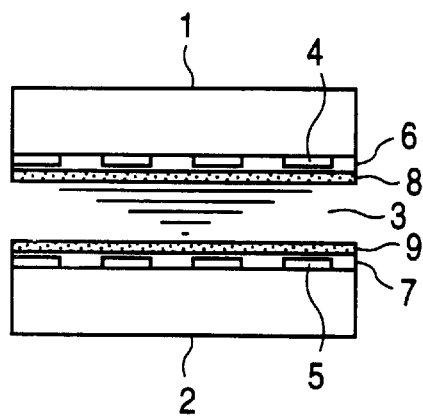
FIGS. 1 to 6 show schematic diagrams of various types of LC cells proposed. These include a transmission cell based on a usual twist-nematic liquid crystal (FIG. 1), a transmission cell based on a usual twist-nematic LC with a differing arrangement of the polarizing layer and electrodes (FIG. 2), a reflection cell based on a usual nematic LC (FIG. 3), a transmission cell based on a supertwist-nematic LC (FIG. 4), an LC cell with the effect of switch color (FIG. 5), and a color matrix LC display (FIG. 6).

The LC element depicted in FIG. 1 comprises two plates (1 and 2) made of glass, plastic, or any other rigid or flexible transparent material. The inner surfaces of these plates facing layer 3 of a nematic liquid crystal are carrying transparent electrodes 4 and 5. Each electrode is covered by a dielectric film (6 or 7) made of a polymer or another suitable material, which smoothes the relief of the electrode and provides for homogeneous surface properties of the plate. The surface of the film can be rendered orientationally anisotropic by rubbing or by some other method, in order to ensure proper orientation of molecules in the polarizing coatings (8 and 9) deposited onto this film. The coatings are oriented in such a way that their axes on plates 1 and 2 are perpendicular to one another. Note that it is the polarizing coatings themselves which produce alignment of the nematic liquid crystal.

Figure 2:
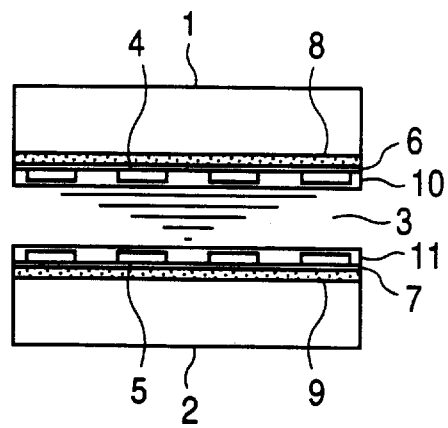

FIG. 2 shows another embodiment of a transmission LC cell, in which a surface of plates 1 and 2 is initially coated with a polarizing film 8 and 9, respectively, protected by a layer 6 and 7, respectively, above which a transparent electrode 4 and 5, respectively, are deposited. These are followed by a layer 10 and 11, respectively, for aligning the nematic liquid crystal. This structure ensures the required smoothness of polarizing film and provides its isolation from the liquid crystal layer, thus preventing LC from becoming contaminated with ions or molecules of foreign substances that can be in the polarizing film.

Figure 3:
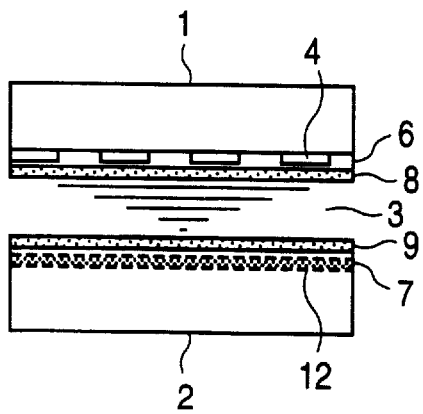

In the LC cell of the reflection type depicted in FIG. 3, the second (mirror-supporting) plate 2 can be made either transparent or non-transparent (e.g., crystalline silicon). This second plate is coated with a diffuse-reflecting layer 12. The reflecting film can be obtained by depositing a polymeric layer containing particles of an arbitrary or special shape and dimensions, having the refractive index differing from that of the polymer itself. For example, a polymer film containing suspended aluminium powder, or some other highly reflecting material, can be deposited. Alternatively, a pattern in or on the plate surface can be created, onto which a reflecting layer 12 (e.g., an aluminum film) is deposited. The pattern can be formed by treating the surface with an abrasive tool, engraving, pressing, depositing a polymeric film with particles having certain shapes and dimensions, or by selectively etching the plate surface (or an overlayer of polymer or some other material) through a mask. Where an aluminum film is formed, it can also serve as the continuous electrode. By photolithographically etching a narrow (10 to 100 mm wide) aluminum strip along a preset path, electrodes of any desired configuration (e.g., rectangular matrices for planar matrix displays) can be formed while retaining the general reflecting background over the entire working) area of the device. The polarizing coating can be deposited onto the reflecting layer either immediately or with a smoothening and isolating interlayer pre-formed on the reflector.

If for any reason the reflecting film cannot be employed as the electrode, (e.g., if the reflector is non-conductive), a special electrode layer can be deposited onto an insulating interlayer or the reflecting film. The insulating layer can be represented by a polymeric film, aluminum oxide, silicon oxide, or some other nonconducting material. The polarizing coating can also be deposited either directly on the reflector or above the electrodes.

Figure 4:
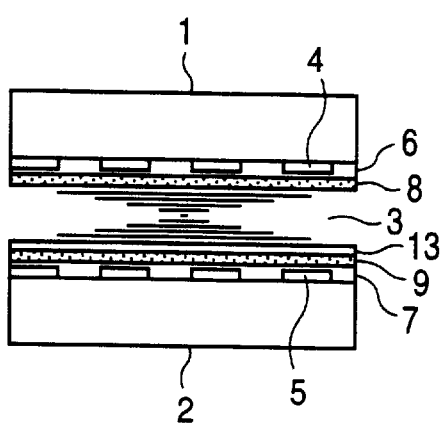

Another transmission mode embodiment of a LC cell is shown in FIG. 4 having a super twisted nematic LC 3. Color compensation is provided by an additional optically anisotropic film 13 with a preset optical thickness, formed on the second (reflecting) plate 2. This film can be deposited either directly onto polarizing film 9, or above the pre-deposited layers 5, 7, or 11 (see FIG. 2). Optical anisotropy is obtained through orientation of molecules in the deposited polymer (or LC-polymer) layer under the action of electromagnetic forces or by mechanically stretching the layer during or after the deposition. Moreover, it is possible to use a photoanisotropic material, which, by photopolymerization of the film in a polarized light allows anisotropic films to be obtained having a specific differential optical pathlength and orientation of the birefringence ellipsoid axes. See Russian Patent No. 2,013,794, *"Liquid Crystal Indicator Element"*, published May 30, 1994, and incorporated herein by reference.

A reflection mode embodiment of an LC cell with a supertwist-nematic film, shown in FIG. 4, may require two additional optically anisotropic layers to be formed. These layers are deposited onto both plates and situated between the polarizing films. They can be applied directly onto the polarizing coatings or indirectly using interlayers.

Using the methods of photolithography or printing techniques for the application of dyes, and using the dyes of various colors, a polarizing layer with differently colored regions can be formed. This markedly extends the informational and ergonomic possibilities of the LC display devices.

Figure 5:
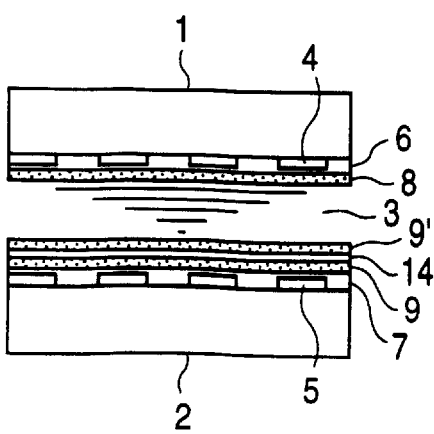

The ability to switch colors can be also provided as shown in the embodiment of FIG. 5. This embodiment uses a neutral grey polarizing film 8 deposited onto one plate, and two polarizing films (9 and 9') applied (one after another or with interlayer 14) onto another plate. The latter two polarizing films (9 and 9') must have differing colors and perpendicular directions of polarization.

Figure 6:
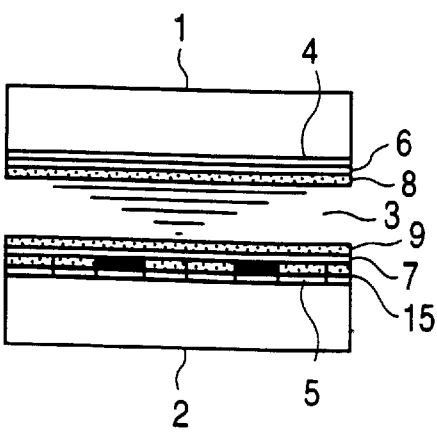

FIG. 6 shows an embodiment of a color matrix LC display obtained by properly arranging the polarizing elements inside the device. In one of these embodiments, the polarizing film is applied either directly onto color filter 15, supported by a transparent electrode matrix 5, or with interlayer 7.

A color filter or a preset color pattern can be produced either by deposition through a photoresist mask, selective dyeing of the polymer layer with the desired dye, deposition of a dye film with the aid of stenciling techniques or by other printing methods. Thus, the arrangement of the polarizer and color filter are not restricted and depends only on convenience and or the technology of layer deposition employed.

Returning to FIG. 1, the principles of operation of an LC display with polarizing elements situated inside the cell can be considered for a transmission embodiment of the display cell having a nematic LC with 90° twist. Nonpolarized light flux is incident to the device from the side of first plate 1. Upon transmission through substrate plate 1, transparent electrode 4, and smoothing interlayer 6, the light is polarized on passage through polarizing film 8. If no voltage is applied to the cell electrodes, the polarized light passes through the layer of liquid crystal 3, whereby its plane of polarization is rotated by 90° and leaves the device, without any additional attenuation, through the second polarizing film 9, interlayer 7, transparent electrode 5, and plate 2. The electrode area would appear as bright. Upon the application of voltage between electrodes, the electric field will convert the nematic LC from the twisted form to the homeotropic. As a result, the optical axis of the nematic LC is oriented perpendicular to plates 1 and 2, and the liquid crystal no longer rotates the plane of polarization of the transmitted light. This implies that the polarization determined by polarizer 8 will not change upon transmission of the light through the LC. Thus, the direction of polarization at the exit from nematic LC 3 will be perpendicular to the orientation of the second polarizer 9. Therefore, the light will be absorbed by polarizer 9 and this region will appear dark. The regions of the cell area where no electrode film is deposited will always appear as bright.

Because the polarization of a plane-polarized light does not change on reflection, the reflection embodiment of the LC cell will operate essentially in the same manner. The only difference consists in that the light does not pass through plate 2, but doubly travels through all other component layers.

In the nematic LC display cell based on the supertwist-nematic liquid crystal (FIG. 4), the plane-polarized light produced by the first polarizer 8 passes through the twisted nematic and becomes elliptically polarized. As a result, the light acquires color because the optical pathlength depends on the wavelength. The optically anisotropic exit layer either compensates coloration of the transmitted light so as to obtain non-colored light at the cell output, or produces the desired color on properly selecting the initial directions of the polarizer axes, the mutual orientation of polarizer and the anisotropic layer, and the thickness of the anisotropic layer. On the application of voltage between the electrode layers, the liquid crystal transforms from twisted to uniaxial state and ceases to rotate the polarization plane of light. In this case, the light passes through the LC layer without changing the orientation of polarization plane.

On the passage through the anisotropic layer, the light becomes circularly or elliptically polarized and, upon passing through the second polarizing film, takes on a complementary coloration to that observed in the initial (switched-off) state.

FIG. 5 illustrates the principle of operation of a color switching device. In the switched-off state, the light passes sequentially through the first polarizing film 8, the nematic liquid crystal 3, which rotates the plane of polarization by 90°, the polarizing film 9' (whose polarization axis is perpendicular to that of first polarizer 8), and is absorbed by the second layer of a dichroic polarizer 9 (whose polarization axis is perpendicular to that of layer 9'). After switching on the cell voltage, the polarization plane of light does not change upon the passage through the liquid crystal. The light is absorbed by the dichroic polarizer 9' and acquires a different color.

Let us consider the matrix LC display (FIG. 6). In the switched-off device, the light passes through polarizer 8, liquid crystal, and the second neutral polarizer 9, and is selectively absorbed by dyed layer 15 to give the device the corresponding color. When the device is switched on, the light is polarized by polarizer 8, passes the liquid crystal layer without rotation of the polarization plane, and is blocked by polarizer 9. As a result, the device appears as dark.

An important distinguishing feature of this invention consists in that the LC display devices (whose variety is not restricted to the examples given above) employ the polarizing films based on the organic dyes capable of forming lyotropic LC phases. These dyes give stable lyotropic LC compositions. Application of such composition onto the surface of plates (glass or polymeric) with simultaneous orienting mechanical treatment, followed by the solvent removal, yields a thin layer of a molecularly ordered dye that serves as a polarizing coating. This coating not only provides efficient polarization of the transmitted light, but also produces alignment of the liquid crystalline component.

High thermal and light stability of the proposed device is ensured by the use of thermostable and light stable dyes that are capable of forming stable lyotropic liquid crystalline phases. Introducing antioxidants or inhibitors to the lyotropic LC composition during application of the polarizing coating can provide enhanced thermal and light stability when desired.

By varying the dye component of the lyotropic LC composition, LC displays of various colors, including grey, can be obtained. The grey color can be also obtained as a result of the layer-by-layer deposition of yellow, red, and blue polarizing films during the formation of polarizers on the cell plates.

The use of lyotropic LC compositions for the formation of polarizers allows both monochrome and colored LC indicators and displays to be made. For this purpose, various methods of layer deposition during the application of polarizing coatings can be employed. These include photogravure and flexographic printing techniques with the use of polygraphic equipment.

In order to ensure high contrast images in the proposed devices, which are intended for application in high-resolution displays, additional orienting and brightness-enhancing layers can be included in the device structure. These layers can be deposited using the same equipment as that employed for the polarizing film application.

The application of dye-based polarizing coatings as polarizers does not exclude the use of conventional polarizing films, including the iodine-colored PVA-based polarizers. For example, a combination of internal polarizing coating on a first plate with iodine-colored reflecting or transmission polarizer adhered to the external surface of a second plate leads to a device characterized by high contrast of the image and no need in the additional glass usually required for protecting the polarizer glued to the external surface of the first plate.

Moreover, the use of polarization coatings allows formation of LC display cells with a traditional external arrangement of polarizers. To this end, a polarizing coating is applied onto a transparent polymeric film, and this film polarizer is fixed to the external surface of plates. Note that such a device would contain a smaller number of component layers as compared to a conventional LC device with PVA-based polarizing films.

DYES SYNTHESIS

EXAMPLE 1

Synthesis of a Dye with Formula I, n=2

5 grams (gm) of a dye with formula I, n=0 (C.I. 51319) is dissolved in 25 ml of sulfuric acid and stirred at 20–25° C. for 7 hours (hr). After the exposure, the reaction mixture is diluted with water to a sulfuric acid concentration of 50%. The reaction mixture is filtered and the residue washed with a 17% hydrochloric acid solution until no sulfate anions are detected in the filtrate. The residue is then dried to yield 6.4 gm of a dye with formula I, n=2.

For: $C34H22Cl2N4O8S2+2H2O$; Found (%): Cl, 8.92, 9.12; N, 6.89, 6.99; S, 8.67, 8.73. Calculated (%): Cl, 9.03; N, 7.13; S, 8.16.

A liquid crystal preparation and polarizing coating formation are performed using methods described in PCT/US, 94/05493, "Thermostable and Lightfast Dichroic Light Polarizers", filed May 20, 1994 and incorporated herein by reference.

EXAMPLE 2

Synthesis of a Dye with Formula I, n=4

5 gm of a dye with formula I, n=0 (C.I. 51319), is dissolved in a mixture of 15–20% fuming sulfuric acid (15 ml) and chlorosulfonic acid (10 ml). The solution is heated to 50° C. and after exposure at 50–60° C. for 3 hr the reaction mixture is diluted with water (10 ml) and then filtered. The residue is washed with 16% hydrochloric acid until no sulfate anions are detected in the filtrate and then dried to yield 6.8 gm of a dye with formula I, n=4.

For: $C34H22Cl2N4O14S4+4H2O$; Found (%): Cl, 6.88, 6.97; N, 5.34, 5.60; S, 13.46, 13.73. Calculated (%): Cl, 7.22; N, 5.71; S, 13.06.

EXAMPLE 3

Synthesis of a Dye with Formula II, n=2

5 gm of a dye with formula II, n=0 is dissolved in a mixture of 15–20% fuming sulfuric acid (15 ml) and chlorosulfonic acid (10 ml). The solution is heated to 80° C. and after exposure at 80–90° C. for 8–10 hr the reaction mixture is diluted with water to a sulfuric acid concentration 50% and filtered. The residue is washed with 16% hydrochloric acid and a water-isopropanol mixture (1:1) until no sulfate and chloride anions are detected in the filtrate and dried to yield 6.3 gm of a dye with formula II, n=2.

For: $C30H16N4O10S2+2H2O$; Found (%): N, 7.88, 7.96; S, 9.48, 9.66. Calculated (%): N, 8.09; S, 9.26.

Similarly, sulfonation of a dye with formula III, X=O, n=0 (C.I. 67000) yields a dye with formula III, X=O, n=2.

For: $C29H14N2O11S2+2H2O$; Found (%): N, 3.86, 4.01; S, 9.58, 9.82. Calculated (%): N, 4.20; S, 9.62.

Similarly, sulfonation of a dye with formula III, X=S, N=0 (C.I. 67100) yields a dye with formula III, X=S, n=2.

For: $C29H14N2O10S3+2H2O$; Found (%): N, 4.00, 4.25; S, 14.43, 14.69. Calculated (%): N, 4.10; S, 14.09.

Similarly, sulfonation of a dye with formula V, N=0 (C.I. 70305) yields a dye with formula V, n=2.

For: $C36H16O8S4+2H2O$; Found (%): S, 17.56, 17.80. Calculated (%): S, 17.31.

Similarly, sulfonation of a dye with formula IV, R=H, R'=(b), R"=Cl, X=SO$_3$M, N=0 yields a dye with formula IV, R=H, R'=(b), R"=Cl, X=SO$_3$M, n=2, M=H.

For: $C28H15ClN2O13S4+2H2O$; Found (%): Cl, 4.80, 5.03; N, 3.51, 3.87; S, 12.70, 13.11. Calculated (%): Cl, 4.70; N, 3.71; S, 12.74.

EXAMPLE 4

Synthesis of a Dye with Formula VI, n=2

5 gm of a dye with formula VI, n=0 is dissolved in 5–10% fuming sulfuric acid (25 ml) and the solution heated at 70–80° C. for 4 hr. After the exposure, the reaction mixture is diluted with water to a sulfuric acid concentration 60% and filtered. The residue is washed with hydrochloric acid until no sulfate anions are detected in the filtrate and dried to yield 6.8 gm of dye with formula VI, n=2.

For: $C28H14N2O8S4+2H2O$; Found (%): N, 3.99, 4.23; S, 18.79, 18.95. Calculated (%): N, 4.18; S, 19.12.

Similarly, sulfonation of a dye with formula VIII, n=0 (dimethylquinacridone) yields a dye with formula VIII, n=3.

For: $C22H16N2O11S3+3H2O$; Found (%): N, 4.35, 4.00; S, 15.11; 15.43. Calculated (%): N, 4.41; S, 15.16.

EXAMPLE 5

Synthesis of a Dye with Formula VII, n=2

5 gm of a dye with formula VII, n=0 (C.I. 70400) is dissolved in 20–45% fuming sulfuric acid (50 ml). Then mercury sulfate (0.03 gm) is added and the mixture is heated to 100° C. After keeping the mixture at 95–105° C. for 8 hr the reaction mixture is diluted with water to a sulfuric acid concentration of 50% and 25 gm sodium chloride is added. The suspension is heated to 75° C. and filtered in the hot state. The residue is washed with a 12% solution of sodium chloride, a 16% hydrochloric acid, and isopropyl alcohol until no sulfate anions are detected in the filtrate and dried to yield 6.0 gm of dye with formula VII, n=2.

For: C30H12N2O10S4+2H2O; Found (%): N, 3.89, 4.00; S, 17.34, 17.66. Calculated (%): N, 3.88; S, 17.74.

Similarly, sulfonation of a dye with formula V, N=0 (C.I. 70305) yields a dye with formula V, n=4.

For: C36H16O14S6+4H2O; Found (%): S, 20.09, 20.33. Calculated (%): S, 20.53.

Similarly, sulfonation of a dye with formula III, X=S, N=0 (C.I. 67100) yields a dye with formula III, X=S, n=3.

For: C29H14N2O13S4+3H2O; Found (%): N, 3.46, 3.71; S, 16.70, 16.83. Calculated (%): N, 3.59; S, 16.43.

Similarly, sulfonation of a dye with formula IV, R=CF3, R'=(c), Y=H, N=0 yields a dye with formula IV, R=CF3, R'=(c), Y=H, n=3.

For: C43H20F3N3O15S3+3H2O; Found (%): N, 4.07, 4.26; S, 9.69, 9.82. Calculated (%): N, 4.10; S, 9.38.

EXAMPLE 6

Synthesis of a Dye with Formula VIII, n=2

5 gm of a dye with formula VIII, n=0, dissolved in 25% fuming sulfuric acid (25 ml) is heated at 45–55° C. for 3 hr. After the exposure, the reaction mixture is diluted with water to a sulfuric acid concentration 55% and 20 gm sodium chloride is added. The suspension is heated to 50° C. and filtered. The residue is dissolved in water, neutralized with ammonia to pH=5–6 and then an equal volume of isopropanol is added. The solution is stored at room temperature for 2–4 hr and then filtered. The residue is washed with water-isopropanol mixture (1:1) and dried to yield 5.4 gm of a dye with formula VIII, n=2, M=NH4.

For: C22H22N4O8S2+2H2O; Found (%): N, 9.45, 9.89; S, 11.11, 11.43. Calculated (%): N, 9.82; S, 11.24.

EXAMPLE 7

Synthesis of a Dye with Formula IX, R=CH3O 5 gm of a dye with formula IX, n=0 is dissolved in 15–20% fuming sulfuric acid (50 ml) and heated at 120–130° C. for 5–7 hr until obtaining a water-soluble probe. After the exposure, the reaction mixture is diluted with water to a sulfuric acid concentration of 50% and filtered. The residue is first washed with 17% hydrochloric acid until no sulfate anions are detected in the filtrate and then with isopropanol. The residue is then dried to yield 6.3 gm of dye with formula IX, R=CH3O, M=H, n=2.

For: C30H22N2O14S2+2H2O; Found (%): N, 3.65, 3.96; S, 8.76, 9.05. Calculated (%): N, 3.81; S, 8.73.

Similarly, sulfonation of a dye with formula IX, R=H, n=0 yields a dye with formula IX, R=H, n=2, M=H.

For: C28H18N2O12S2+2H2O; Found (%): N, 3.97, 4.08; S, 9.61, 9.88. Calculated (%): N, 4.15; S, 9.50.

Similarly, sulfonation of a dye with formula IX, R=Cl, n=0 yields a dye with formula IX, R=Cl, n=2, M=H.

For: C28H16Cl2N2O12S2+2H2O; Found (%): Cl, 9.49, 9.63; N, 3.65, 3.78; S, 8.71, 8.97. Calculated (%): Cl, 9.54; N, 3.77; S, 8.62.

Similarly, sulfonation of a dye with formula IX, R=CH3, n=0 yields a dye with formula IX, R=CH3, n=2, M=H.

For: C30H22N2O12S2+2H2O; Found (%): N, 4.05, 4.11; S, 9.42, 9.69. Calculated (%): N, 3.99; S, 9.13.

Similarly, sulfonation of a dye with formula X, R=H, X=O, n=0 yields a dye with formula X, R=H, X=O, n=2, M=H.

For: C28H17N3O11S2+2H2O; Found (%): N, 5.99, 6.17; S, 9.67, 9.81. Calculated (%): N, 6.26; S, 9.55.

Similarly, sulfonation of a dye with formula X, R=C2H5O, X=O, n=0 yields a dye with formula X, R=C2H5O, X=O, n=2, M=H.

For: C30H21N3O12S2+2H2O; Found (%): N, 5.49, 5.66; S, 8.90, 9.31. Calculated (%): N, 5.87; S, 8.96.

Similarly, sulfonation of a dye with formula X, R=CH3O, X=NH, N=0 yields a dye with formula X, R=CH3O, X=NH, n=2, M=H.

For: C29H20N4O11S2+2H2O; Found (%): N, 7.60, 7.91; S, 9.23, 9.58. Calculated (%): N, 8.00; S, 9.15.

Similarly, sulfonation of a dye with formula X, R=NH2, X=CH2, N=0 yields a dye with formula X, R=NH2, X=CH2, n=2, M=H.

For: C29H20N4O10S2+2H2O; Found (%): N, 7.59, 7.80; S, 9.51, 9.67. Calculated (%): N, 8.18; S, 9.37.

Similarly, sulfonation of a dye with formula X, R=Br, X=NH, N=0 yields a dye with formula X, R=Br, X=NH, n=2, M=H.

For: C28H17BrN4O10S2+2H2O; Found (%): Br, 10.31, 10.46; N, 7.13, 7.42; S, 8.50, 8.68. Calculated (%): Br, 10.66; N, 7.48; S, 8.55.

Similarly, sulfonation of a dye with formula X, R=NHCH3, X=NH, N=0 yields a dye with formula X, R=NHCH3, X=NH, n=2, M=H.

For: C29H22N5O10S2+2H2O; Found (%): N, 10.13, 10.23; S, 9.40, 9.58. Calculated (%): N, 10.00; S, 9.15.

We claim:

1. A liquid crystal display comprising:
   a first substrate plate and a second substrate plate, each plate having an inner surface and an outer surface;
   a polarizing coating disposed overlying the inner surface of each plate, the polarizing coating formed from a lyotropic liquid crystal solution comprising one or more organic dyes selected from the group consisting of molecules where M is a cation and having Structure I where n=2, 3, or 4, Structure II, where n=2, Structure III where n=2 or 3, Structure V, where n=2, 3, or 4, Structure VI, where n=2, Structure VII where n=2, Structure VIII where n=2 or 3, Structure IX where n=2 and R=H, Cl, Alk, or OAlk, Structure X where n=2, X=O, NH, or $CH_2$ and R=H, Cl, Br, OAlk or NHR', and Structure IV where n=1, 2, or 3, R=H or $CF_3$, X=H, Br, or $SO_3M$ and R'=(b), or (c); and
   a liquid crystal layer disposed between the inner surface of the first plate and the inner surface of the second plate.

2. The liquid crystal display of claim 1 wherein said first and second substrate plates comprise electrodes overlying said inner surface of each plate.

3. The liquid crystal display of claim 1 further comprising at least one internal polarizing coating.

4. The liquid crystal display of claim 1 wherein said polarizing coating is an anisotropic absorbing layer of said molecules of one or more organic dyes.

5. The liquid crystal display of claim 1 further comprising a diffuse reflecting coating disposed overlying said second substrate plate and underlying said polarizing coating.

6. The liquid crystal display of claim 1 further comprising a birefringent layer overlying said polarizing coating disposed on said second substrate plate.

7. The liquid crystal display of claim 1 further comprising a birefringent layer overlying said polarizing coating disposed on said first substrate plate.

8. The liquid crystal display of claim 1 further comprising a layer formed from colored patterns disposed underlying said polarizing coating of said first substrate plate and/or said second substrate plate.

9. The liquid crystal display of claim 1 wherein each polarizing coating is a different color.

10. The liquid crystal display of claim 9 wherein said each polarizing coating is oriented to have a different polarization axis.

11. The liquid crystal display of claim 1 wherein each polarizing coating is oriented to have a different polarization axis.

12. The liquid crystal display of claim 11 wherein said polarization axes are perpendicular.

* * * * *